United States Patent
Yan

(10) Patent No.: US 10,692,449 B2
(45) Date of Patent: Jun. 23, 2020

(54) ALIGNMENT METHOD BASED ON PIXEL COLOR AND ALIGNMENT SYSTEM FOR USING THE SAME

(71) Applicant: SHENZHEN CHINA STAR OPTOELECTRONICS SEMICONDUCTOR DISPLAY TECHNOLOGY CO., LTD, Shenzhen, Guangdong (CN)

(72) Inventor: Daobo Yan, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 325 days.

(21) Appl. No.: 15/752,650

(22) PCT Filed: Jan. 17, 2018

(86) PCT No.: PCT/CN2018/073044
§ 371 (c)(1),
(2) Date: Feb. 14, 2018

(87) PCT Pub. No.: WO2019/127703
PCT Pub. Date: Jul. 4, 2019

(65) Prior Publication Data
US 2020/0135124 A1 Apr. 30, 2020

(30) Foreign Application Priority Data
Dec. 29, 2017 (CN) .......................... 2017 1 1478763

(51) Int. Cl.
*G09G 3/36* (2006.01)
*G09G 3/20* (2006.01)

(52) U.S. Cl.
CPC ......... *G09G 3/3611* (2013.01); *G09G 3/2003* (2013.01); *G09G 3/3607* (2013.01); *G09G 2300/0443* (2013.01)

(58) Field of Classification Search
CPC .................................................... G09G 3/3611
(Continued)

(56) References Cited

U.S. PATENT DOCUMENTS

2008/0159595 A1* 7/2008 Park ........................ G01S 17/48
382/106

FOREIGN PATENT DOCUMENTS

CN 101038352 A 9/2007
CN 101609227 A 12/2009
(Continued)

*Primary Examiner* — Long D Pham
(74) *Attorney, Agent, or Firm* — Hemisphere Law, PLLC; Zhigang Ma

(57) ABSTRACT

An alignment method based on pixel color and an alignment system for using the same is disclosed. The method includes: Step S1: retrieving a photoresistance eigenvalue of each subcolor resist illuminated by a light source and setting a pixel threshold according to the photoresistance eigenvalue; Step S2: performing a binarization process on a pixel according to the pixel threshold to obtain a binary pixel; and Step S3: calculating an alignment position according to the binary pixel and aligning the color resist according to the alignment position. The present invention avoids the distribution of metal traces and patterns of a color filter on array (COA) product, improves the stability of measuring the COA product, aligns pixel with different shapes, and edits the computing logic for measured positions. When the shape of the pixel is irregular, the reasonable logic is selected to define the measured positions.

14 Claims, 2 Drawing Sheets

(58) Field of Classification Search
USPC .......................................................... 345/87
See application file for complete search history.

(56) References Cited

FOREIGN PATENT DOCUMENTS

| | | |
|---|---|---|
| CN | 102667853 A | 9/2012 |
| CN | 102667863 A | 9/2012 |
| CN | 105593669 A | 5/2016 |
| KR | 20140052679 | 5/2014 |

* cited by examiner

ALIGNMENT METHOD BASED ON PIXEL COLOR AND ALIGNMENT SYSTEM FOR USING THE SAME

RELATED APPLICATIONS

The present application is a National Phase of International Application Number PCT/CN2018/073044, filed Jan. 17, 2018, and claims the priority of China Application No. 201711478763.7, filed Dec. 29, 2017.

FIELD OF THE DISCLOSURE

The disclosure relates to a liquid crystal display technical field, and more particularly to an alignment method based on pixel color and an alignment system for using the same.

BACKGROUND

In a process of fabricating a color filter of a panel industry, the saturation (abbreviated as colorfulness) of red (R), green (G), and blue (B) is a parameter for optical properties of a LCD, which directly affects experience of clients. Thus, colorfulness of different color resists is monitored in each processing procedure.

Presently, when the colorfulness of a color resist is measured, an alignment is performed according to pattern match. Due to the distribution of metal traces and patterns of a color filter on array (COA) product, incorrect patterns are easily retrieved. Thus, the precision of an alignment is lower, which results in large variations for measuring data and affects the determination of a fabrication process. It is very risky to produce abnormal products.

In order to effectively monitor colorfulness, increasing the precision of aligning color resists is the first difficulty.

As a result, in order to overcome the abovementioned difficulty, it is necessary to provide an alignment method based on pixel color and an alignment system for using the same.

SUMMARY

A technical problem to be solved by the disclosure is to provide a LCD panel and a method for fabricating the same.

An objective of the disclosure is achieved by following embodiments.

An alignment method based on pixel color, comprising:

Step S1: retrieving a photoresistance eigenvalue of each subcolor resist illuminated by a light source and setting a pixel threshold according to the photoresistance eigenvalue;

Step S2: performing a binarization process on a pixel according to the pixel threshold to obtain a binary pixel; and Step S3: calculating an alignment position according to the binary pixel and aligning the color resist according to the alignment position.

In an embodiment, the binarization process in Step S2 is a global fixed binarization process or a local adaptive binarization process.

In an embodiment, the global fixed binarization process comprises: setting a gray level value of each pixel point of the pixel according to a pixel threshold T1 to 0 or 255;

when the pixel value of the pixel point is larger than the pixel threshold T1, the pixel value of the pixel point is set to 255; and when the pixel value of the pixel point is not larger than the pixel threshold T1, the pixel value of the pixel point is set to 0.

In an embodiment, the local adaptive binarization process comprises:

calculating a pixel threshold T2 corresponding to a pixel point according to a local pixel characteristic of an aperture where the pixel point is located;

when the pixel value of the pixel point is larger than the pixel threshold T2, the pixel value of the pixel point is set to 255; and when the pixel value of the pixel point is not larger than the pixel threshold T2, the pixel value of the pixel point is set to 0.

In an embodiment, the pixel threshold T2 of the local adaptive binarization process is expressed by $T2=a*E+b*P+c*Q$, wherein a, b, and c are free parameters, E is an average value of the pixel values of the aperture, P is a square of a difference between the pixel values, and Q is a mean effective value of the pixel values of the aperture.

In an embodiment, in Step S3 of calculating the alignment position according to the binary pixel, a position of a geometric centroid of the binary pixel according to a shape of the binary pixel is determined and used as the alignment position.

In an embodiment, the color resist is a red subcolor resist, a green subcolor resist, or a blue subcolor resist.

In an embodiment, the pixel threshold is set according to the photoresistance eigenvalue of the red subcolor resist.

An alignment system based on pixel color, comprising:

a threshold setting unit retrieving a photoresistance eigenvalue of each subcolor resist illuminated by a light source and setting a pixel threshold according to the photoresistance eigenvalue;

a pixel processing unit performing a binarization process on a pixel according to the pixel threshold to obtain a binary pixel; and a positioning unit calculating an alignment position according to the binary pixel and aligning the color resist according to the alignment position.

In an embodiment, the pixel processing unit performs a global fixed binarization process or a local adaptive binarization process on the pixel according to the pixel threshold to obtain the binary pixel.

The present invention has advantages as follows:

The present invention avoids the distribution of metal traces and patterns of a color filter on array (COA) product, and improves the stability of measuring the COA product.

The present invention aligns pixel with different shapes, and edits the computing logic for measured positions. When the shape of the pixel is irregular, the reasonable logic is selected to define the measured positions.

A binarization process spotlights characteristics of color resists so as to increase the precision of recognizing color.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to understand the above objectives, features and advantages of the present disclosure more clearly, the present disclosure is described in detail below with references to the accompanying drawings and specific embodiments. The present disclosure is only to exemplify the present invention but not to limit the scope of the present invention.

Figure 1:
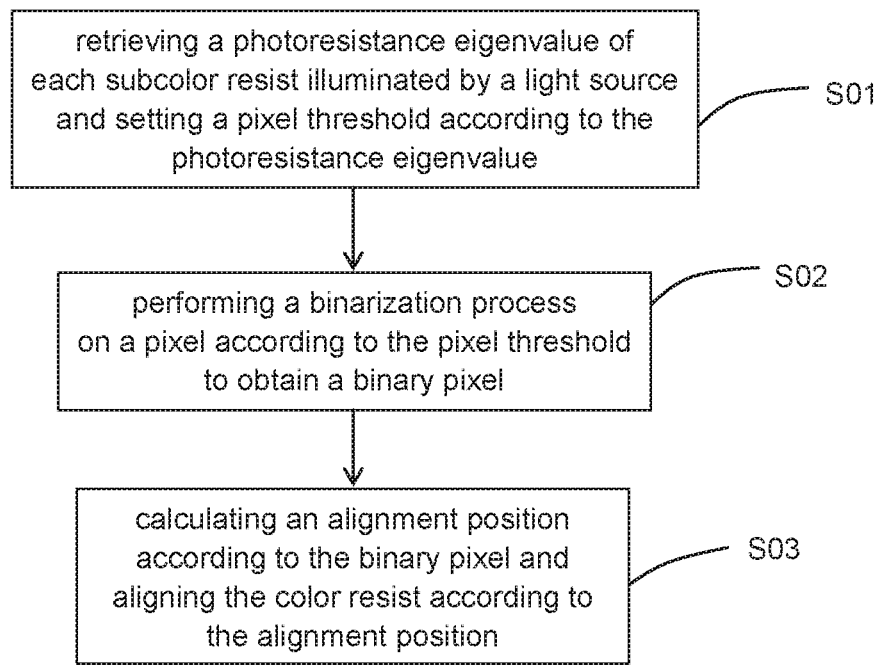
FIG. 1 is a flowchart of an alignment method based on pixel color according to an embodiment of the disclosure.

Refer to FIG. 1. The present invention provides an alignment method based on pixel color, comprising:

Step S1: retrieving a photoresistance eigenvalue of each subcolor resist illuminated by a light source and setting a pixel threshold according to the photoresistance eigenvalue;

Step S2: performing a binarization process on a pixel according to the pixel threshold to obtain a binary pixel; and Step S3: calculating an alignment position according to the binary pixel and aligning the color resist according to the alignment position.

Figure 2:
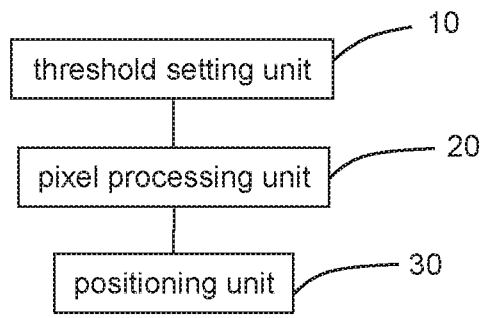
FIG. 2 is a modular schematic view of an alignment system based on pixel color according to an embodiment of the disclosure.

Correspondingly, the present invention provides an alignment system based on pixel color, as shown in FIG. 2. The alignment system comprises:

a threshold setting unit 10 retrieving a photoresistance eigenvalue of each subcolor resist illuminated by a light source and setting a pixel threshold according to the photoresistance eigenvalue;

a pixel processing unit 20 performing a binarization process on a pixel according to the pixel threshold to obtain a binary pixel; and a positioning unit 30 calculating an alignment position according to the binary pixel and aligning the color resist according to the alignment position.

The alignment method and the alignment system of the present invention perform an alignment according to pixel color. The alignment based on pixel color includes two steps of color recognition and central alignment.

A normal color filter comprises a red subcolor resist R, a green subcolor resist G, and a blue subcolor resist B. The red subcolor resist R, the green subcolor resist G, and the blue subcolor resist B illuminated by a light source have different photoresistance eigenvalues. Usually, the photoresistance eigenvalue of the red subcolor resist R are greatly higher than the photoresistance eigenvalues of the green subcolor resist G and the blue subcolor resist B. The color resists are precisely positioned by setting a threshold of each photoresistance eigenvalue and performing a binarization process on a pixel.

As a result, a pixel threshold T is firstly set according to the photoresistance eigenvalue. Then, a binarization process is performed on a pixel according to the pixel threshold to obtain a binary pixel. Finally, an alignment position is calculated according to the binary pixel and the color resist is aligned according to the alignment position.

Wherein, the binarization process of the present invention is a global fixed binarization process or a local adaptive binarization process.

The global fixed binarization process performs a binarization process on the whole pixel according to one pixel threshold and comprises:

setting a gray level value of each pixel point of the pixel according to a pixel threshold T1 to 0 or 255;

when the pixel value of the pixel point is larger than the pixel threshold T1, the pixel value of the pixel point is set to 255; and when the pixel value of the pixel point is not larger than the pixel threshold T1, the pixel value of the pixel point is set to 0.

The local adaptive binarization process determines a pixel threshold of the position of the pixel according to the distribution of pixel values of an aperture where a pixel point. The advantage is in that the pixel threshold of the position of each pixel is not fixed but determined according to the distribution of pixel values within the aperture. The local adaptive binarization process comprises:

calculating a pixel threshold T2 corresponding to a pixel point according to a local pixel characteristic of an aperture where the pixel point is located;

when the pixel value of the pixel point is larger than the pixel threshold T2, the pixel value of the pixel point is set to 255; and when the pixel value of the pixel point is not larger than the pixel threshold T2, the pixel value of the pixel point is set to 0.

The pixel threshold T2 of the local adaptive binarization process is expressed by $T2=a*E+b*P+c*Q$, wherein a, b, and c are free parameters, E is an average value of the pixel values of the aperture, P is a square of a difference between the pixel values, and Q is a mean effective value of the pixel values of the aperture.

Furthermore, the measured position of the pixel processed by a binarization process is logically computed. Taking the position of a geometric centroid as an example for an explanation. The step of calculating the alignment position according to the binary pixel comprises:

The position of a geometric centroid of the binary pixel is determined and used as the alignment position according to a shape of the binary pixel.

For example, the geometric centroid of a triangle is an intersection of two median lines of the triangle. The geometric centroid of a quadrangle is an intersection of a median line and a line connected with two geometric centroids of two triangles, wherein a diagonal of the quadrangle is used to divide the quadrangle into the triangles. The geometric centroid of a parallelogram is an intersection of two diagonals of the parallelogram.

It is understood that the present invention takes subcolor resists R, G, and B as an example for an explanation. Certainly, other color resist may be used, such as a black subcolor resist B.

Figure 3A:
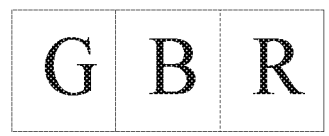
FIG. 3a, FIG. 3b, and FIG. 3c are respectively schematic views of an original pixel, a pixel processed according to a pixel threshold, and a pixel processed by a binarization process according to an embodiment of the disclosure.

According to an embodiment of the present invention, the alignment method based on pixel color comprises:

Refer to FIG. 3a. The photoresistance eigenvalues of subcolor resists R, G, and B illuminated by a light source are retrieved and a pixel threshold T1 is set to 180 according to the photoresistance eigenvalues of the subcolor resists R, G, and B.

Figure 3B:
Figure 3C:
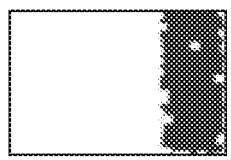

The binarization process is performed on a pixel shown in FIG. 3b according to the pixel threshold T1 to obtain a binary pixel shown in FIG. 3c.

The embodiment uses a global fixed binarization process. The gray level value of each pixel point of the pixel is set to 0 or 255 according to the pixel threshold T1. When the pixel value of the pixel point is larger than the pixel threshold T1, the pixel value of the pixel point is set to 255. When the pixel value of the pixel point is not larger than the pixel threshold T1, the pixel value of the pixel point is set to 0.

Finally, an alignment position is calculated according to the binary pixel process by the global fixed binarization process and the color resists are aligned according to the alignment position.

Certainly, in other embodiments, the binarization process may be alternatively a local adaptive binarization process. The present invention no more details an explanation for the local adaptive binarization process.

According to an embodiment of the present invention, an electronic device is provided. The electronic device comprises at least one processor and a storage connected to the at least one processor. The storage is used to store a command performed by the at least one processor. When the command is performed by the at least one processor, the at least one processor performs the alignment method of the abovementioned embodiment.

According to an embodiment of the present invention, a non-transient storing medium is provided. The non-transient storing medium stores an executable command of a computer. The executable command of the computer is configured to perform the alignment method.

According to an embodiment of the present invention, a computer programming product is provided. The computer programming product comprises a computer program stored in a readable medium of a non-transient computer. The computer program comprises a programming command. When the programming command is performed by a computer, the computer performs the alignment method.

The alignment system of the present invention can perform the alignment method, have corresponding functional modules, and achieves the beneficial effect. The alignment of the present invention describes the technical details not disclosed in the abovementioned embodiments.

From the abovementioned embodiments, the present invention has advantage as follows:

The present invention avoids the distribution of metal traces and patterns of a color filter on array (COA) product, and improves the stability of measuring the COA product.

The present invention aligns pixel with different shapes, and edits the computing logic for measured positions. When the shape of the pixel is irregular, the reasonable logic is selected to define the measured positions.

The binarization process spotlights characteristics of color resists so as to increase the precision of recognizing color.

The alignment method based on pixel color and the alignment system using the same are applied to a multi-channel photo detector (MCPD), other fields and equipment to improve the positioning precision.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application. Claims should not be limited due to any marks of the claims.

Besides, it is understood that each embodiment does not only include one independent technical program although the specification is described according the embodiments. The description of the specification is merely clear. For the person skilled in the art of the disclosure, the specification should be viewed as a whole. The technical programs of the embodiments can be suitably combined to form other embodiments understood by the person skilled in the art.

What is claimed is:

1. An alignment method based on pixel color, comprising:
    Step S1: retrieving a photoresistance eigenvalue of each subcolor resist illuminated by a light source and setting a pixel threshold according to the photoresistance eigenvalue;
    Step S2: performing a binarization process on a pixel according to the pixel threshold to obtain a binary pixel; and
    Step S3: calculating an alignment position according to the binary pixel and aligning the color resist according to the alignment position.

2. The alignment method based on pixel color according to claim 1, wherein the binarization process in Step S2 is a global fixed binarization process or a local adaptive binarization process.

3. The alignment method based on pixel color according to claim 2, wherein the global fixed binarization process comprises:
    setting a gray level value of each pixel point of the pixel according to a pixel threshold T1 to 0 or 255;
    when the pixel value of the pixel point is larger than the pixel threshold T1, the pixel value of the pixel point is set to 255; and
    when the pixel value of the pixel point is not larger than the pixel threshold T1, the pixel value of the pixel point is set to 0.

4. The alignment method based on pixel color according to claim 2, wherein the local adaptive binarization process comprises:
    calculating a pixel threshold T2 corresponding to a pixel point according to a local pixel characteristic of an aperture where the pixel point is located;
    when the pixel value of the pixel point is larger than the pixel threshold T2, the pixel value of the pixel point is set to 255; and
    when the pixel value of the pixel point is not larger than the pixel threshold T2, the pixel value of the pixel point is set to 0.

5. The alignment method based on pixel color according to claim 4, wherein the pixel threshold T2 of the local adaptive binarization process is expressed by $T2=a*E+b*P+c*Q$, wherein a, b, and c are free parameters, E is an average value of the pixel values of the aperture, P is a square of a difference between the pixel values, and Q is a mean effective value of the pixel values of the aperture.

6. The alignment method based on pixel color according to claim 1, wherein in Step S3 of calculating the alignment position according to the binary pixel, a position of a geometric centroid of the binary pixel is determined and used as the alignment position according to a shape of the binary pixel.

7. The alignment method based on pixel color according to claim 6, wherein the binarization process in Step S2 is a global fixed binarization process or a local adaptive binarization process.

8. The alignment method based on pixel color according to claim 7, wherein the global fixed binarization process comprises:
    setting a gray level value of each pixel point of the pixel according to a pixel threshold T1 to 0 or 255;
    when the pixel value of the pixel point is larger than the pixel threshold T1, the pixel value of the pixel point is set to 255; and
    when the pixel value of the pixel point is not larger than the pixel threshold T1, the pixel value of the pixel point is set to 0.

9. The alignment method based on pixel color according to claim 7, the local adaptive binarization process comprises:

calculating a pixel threshold T2 corresponding to the pixel point according to a local pixel characteristic of an aperture where the pixel point is located;

when the pixel value of the pixel point is larger than the pixel threshold T2, the pixel value of the pixel point is set to 255; and when the pixel value of the pixel point is not larger than the pixel threshold T2, the pixel value of the pixel point is set to 0.

10. The alignment method based on pixel color according to claim 9, wherein the pixel threshold T2 of the local adaptive binarization process is expressed by T2=a*E+b*P+c*Q, wherein a, b, and c are free parameters, E is an average value of the pixel values of the aperture, P is a square of a difference between the pixel values, and Q is a mean effective value of the pixel values of the aperture.

11. The alignment method based on pixel color according to claim 1, wherein the color resist is a red subcolor resist, a green subcolor resist, or a blue subcolor resist.

12. The alignment method based on pixel color according to claim 1, wherein the pixel threshold is set according to the photoresistance eigenvalue of the red subcolor resist.

13. An alignment system based on pixel color, comprising a processor configured to:

retrieve a photoresistance eigenvalue of each subcolor resist illuminated by a light source and set a pixel threshold according to the photoresistance eigenvalue;

perform a binarization process on a pixel according to the pixel threshold to obtain a binary pixel; and calculate an alignment position according to the binary pixel and align the color resist according to the alignment position.

14. The alignment system based on pixel color according to claim 13, wherein the binarization process is a global fixed binarization process or a local adaptive binarization process.

\* \* \* \* \*